R. C. FORCE.
AUTOMATIC FEED TROUGH.
APPLICATION FILED MAR. 17, 1919.
1,331,008.
Patented Feb. 17, 1920.
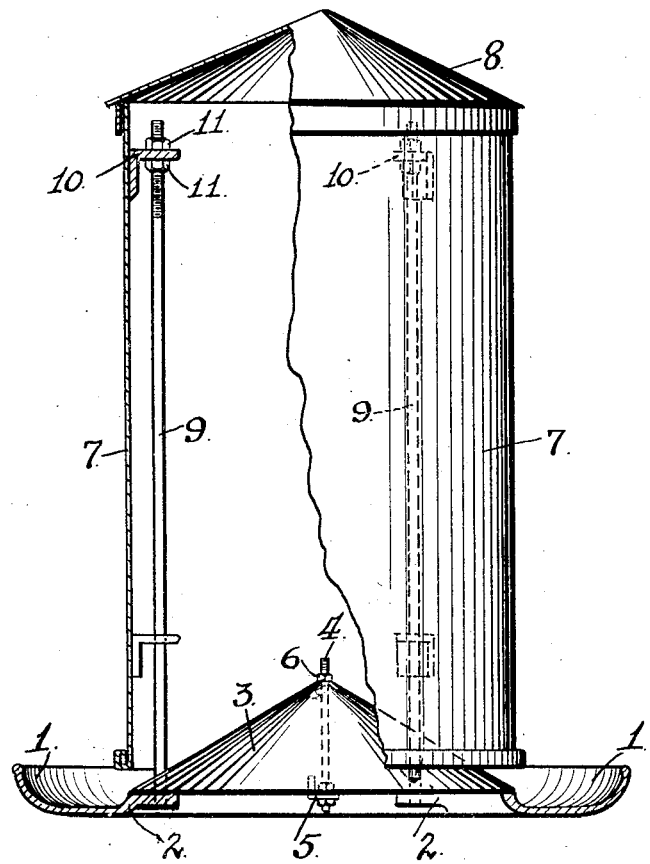
WITNESS
Wm G. Drew
INVENTOR
Raymond C. Force
BY
Booth & Booth
ATTORNEYS

UNITED STATES PATENT OFFICE.

RAYMOND C. FORCE, OF OAKLAND, CALIFORNIA, ASSIGNOR TO CALIFORNIA CORRUGATED CULVERT COMPANY, OF OAKLAND, CALIFORNIA, A CORPORATION OF CALIFORNIA.

AUTOMATIC FEED-TROUGH.

1,331,008.  Specification of Letters Patent.  Patented Feb. 17, 1920.

Application filed March 17, 1919. Serial No. 283,234.

*To all whom it may concern:*

Be it known that I, RAYMOND C. FORCE, a citizen of the United States, residing at Oakland, in the county of Alameda and State of California, have invented certain new and useful Improvements in Automatic Feed-Troughs, of which the following is a specification.

My invention relates to feed-troughs for automatically supplying food-stuff of fluent solid nature, such as grain, to an exposed trough space accessible to the animals.

It is particularly intended for feeding animals, such as hogs, prone to roughness and having a propensity to bodily invade the trough. Accordingly, the essential objects of my invention are to provide a structure having stability and capable of withstanding rough usage, and having also positive guards against invasion of the feeding space, such guards, for example, as a relatively contracted and preferably circular feeding space and a barrier wall defining said space. To these objects are added capability of automatic supply and the adjustment thereof.

With these objects in view my invention consists in the novel feed-trough which I shall hereinafter fully describe, by reference to the accompanying drawings in which the figure is a view of my device partly in elevation and partly in vertical section.

1 is a relatively heavy cast-iron trough-like base to give stability and weight to the structure, and preferably of annular shape to afford access to the trough for the maximum number of animals. This base has an inner flange 2, upon which is supported the sloping member 3, which is best in the form of a cone, the base of the cone being substantially alined with the inner wall of the trough, which latter is by intention, relatively narrow.

The conical member 3 is secured to the base member 1, by a rod 4 rising from a cross bar 5 and passing upwardly through the apex of the cone, receiving a nut 6 on its top. The slope of the conical member 3 is greater than the angle of repose for the material being fed, so that said material tends to flow to and into the feed trough of the base 1.

7 is the supply or hopper member, open at its bottom and provided at its top with a cover 8.

This hopper member which is relatively light being made of sheet metal is supported from the base member, by rods 9 rising from the base member, and passing through brackets 10 at the top of the hopper member. Nuts 11 on the top of these rods provide for a vertical adjustment of said hopper member. The open base of the hopper member is spaced from the conical member 3 and lies above the trough of the base 1, thus providing for the passage of the material into said trough, and this passage is controlled as to its capacity by the vertical adjustment of the hopper member.

As the animals consume the feed in the trough space, more material automatically flows into it. It will now be seen that on account of the relatively heavy base, the structure will withstand rough usage, and because of its narrow feed space, the annular shape and the positive barrier of the hopper member, the animals cannot invade the trough, and the greatest number can have access to it.

I claim:—

1. An automatic feed-trough comprising a base-member with a trough; a member fitted upon the back wall of the base member and sloping downwardly to the trough; an open bottom hopper member supported from the base member and spaced from the sloping member, the lower edge of said hopper member lying above and raised from the trough; and means for vertically adjusting said hopper member to vary the distance of its lower edge above said trough, comprising rods rising from the base member, brackets on the inner surface of the hopper member through which said rods pass, and nuts on the rods associated with the brackets.

2. An automatic feed-trough comprising an annular base member with a trough and a cross bar; a conical member fitted upon the inner wall of said base member and sloping to the trough; a rod rising from the cross bar of the base member and passing through the apex of the conical member, said rod having a top nut to hold the conical member to the base member; a cylindrical open-bottom hopper member supported from the base member and inclosing and spaced from the conical member, the lower edge of said hopper member lying above and raised from the trough; and means for vertically adjusting said hopper member to vary the distance of the lower edge above said trough, comprising rods rising from the base member, brackets on the inner surface of the hopper member through which said rods pass, and nuts on the rods associated with the brackets.

In testimony whereof I have signed my name to this specification in the presence of two subscribing witnesses.

RAYMOND C. FORCE.

Witnesses:
S. A. FORD,
E. W. FRATERS.